May 29, 1923.
H. A. POPPENHUSEN
WATER BOX FOR FURNACES
Filed Aug. 17, 1921
1,456,650
2 Sheets-Sheet 2
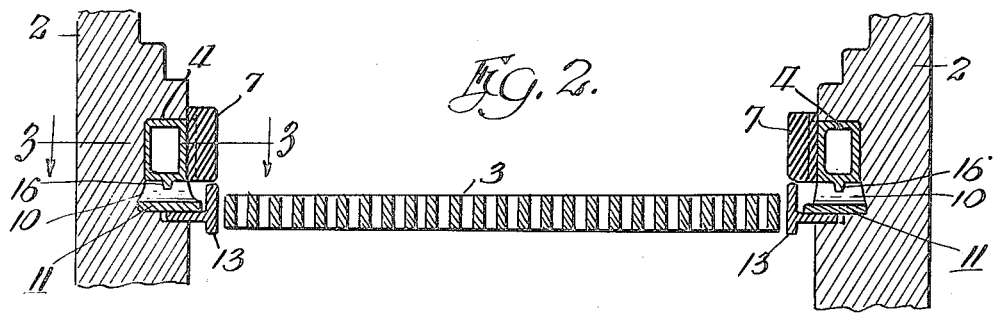
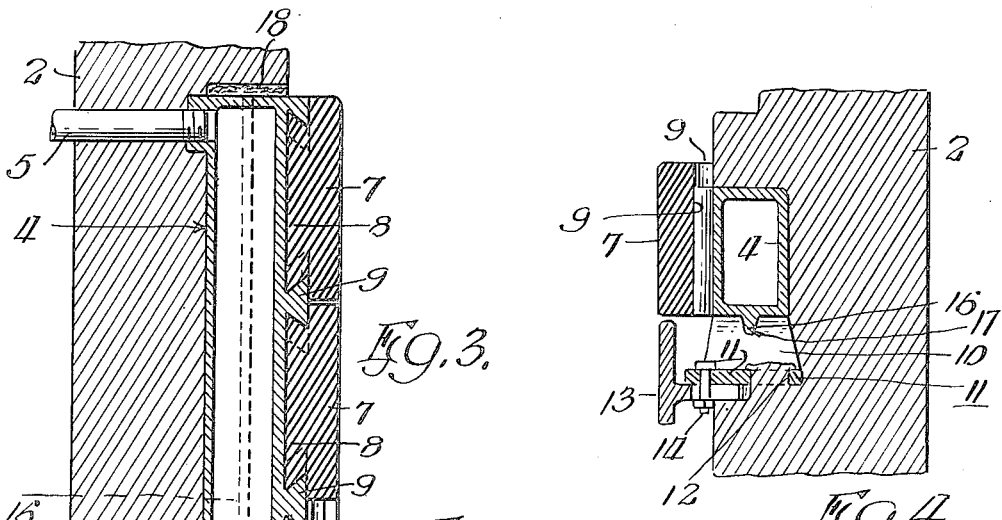
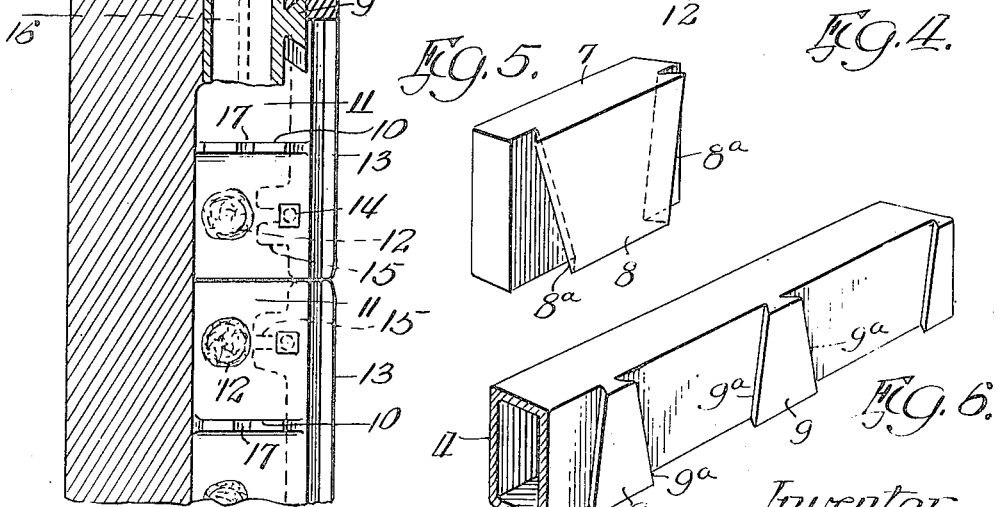
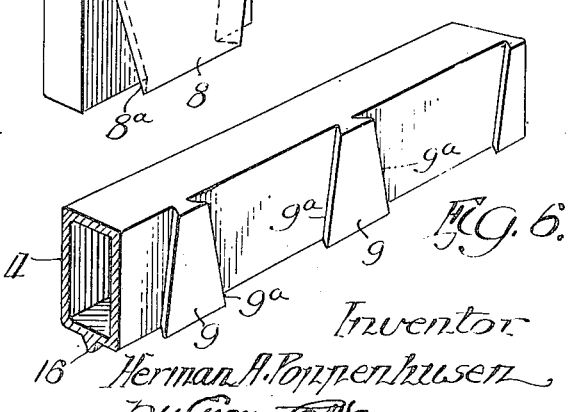
Inventor
Herman A. Poppenhusen Patented May 29, 1923.

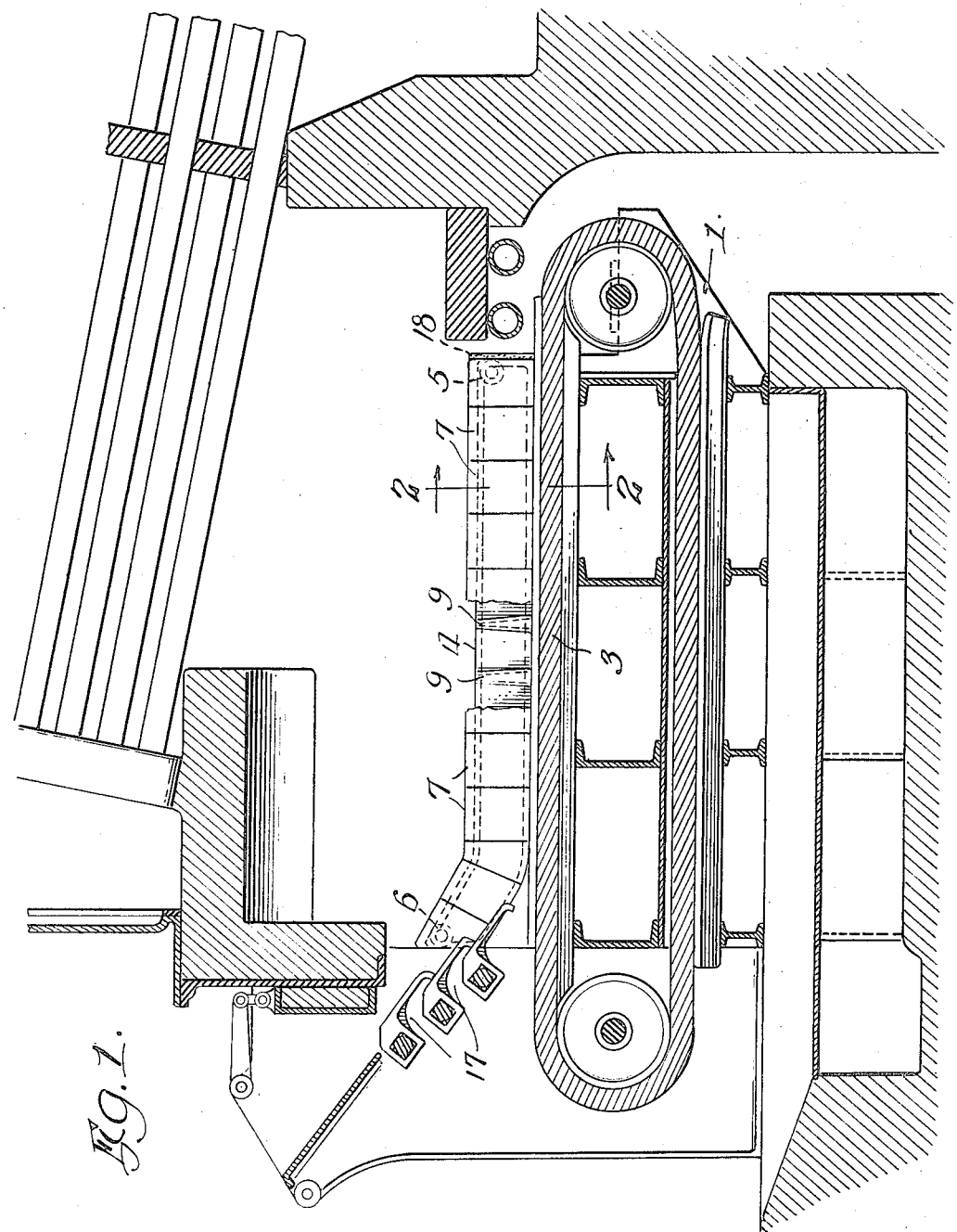

1,456,650

UNITED STATES PATENT OFFICE.

HERMAN A. POPPENHUSEN, OF HAMMOND, INDIANA, ASSIGNOR TO GREEN ENGINEERING COMPANY, OF EAST CHICAGO, INDIANA, A CORPORATION OF ILLINOIS.

WATER BOX FOR FURNACES.

Application filed August 17, 1921. Serial No. 492,948.

*To all whom it may concern:*

Be it known that I, HERMAN A. POPPENHUSEN, a citizen of the United States, residing at Hammond, in the county of Lake and State of Indiana, have invented new and useful Improvements in Water Boxes for Furnaces, of which the following is a specification.

This invention relates to furnaces and more particularly to water cooled boxes therefor.

One object of the invention is to apply heat resisting tiles to the inner faces of the water boxes and have the tiles in direct contact with the fuel bed on the grate for insulating the boxes from the fuel bed and the heat produced in the combustion chamber of the furnace, and thus prevent burning out of said boxes.

A further object of my invention is to provide a detachable or removable connection between the tiles and the boxes so that application of the tiles to and removal of the same from the boxes may be readily accomplished without disturbing the mounting of the boxes in the furnace.

The invention consists further in the matters hereinafter described and more particularly set forth in the appended claims.

In the accompanying drawings—

Fig. 1 is a vertical longitudinal sectional view taken through a chain grate stoker furnace provided with side water boxes and applied tiles in accordance with my invention;

Fig. 2 is a transverse vertical sectional view taken on line 2—2 of Fig. 1;

Fig. 3 is a horizontal sectional view, with parts in elevation, taken through one of the side boxes, on the line 3—3 of Fig. 2;

Fig. 4 is an enlarged vertical sectional view taken through one of the side boxes and associated parts; and Figs. 5 and 6 are perspective views of one of the tiles and water boxes, respectively.

In the drawings, 1 indicates a chain grate stoker extending into the combustion chamber of a furnace between the side walls 2, 2 thereof, the top lead 3 of the chain supporting the fuel bed in a layer and carrying the same from the front to the rear end of the combustion chamber, as usual in furnace construction of this general character.

Extending along the sides of the top lead 3 of the chain grate are water boxes 4, 4, each having an inlet pipe 5 at one end and an outlet pipe 6 at the opposite end, as shown in Fig. 1, so that cooling water may be circulated therethrough for keeping the same relatively cool. As illustrated in Fig. 2, there is a water box 4 in each side wall 2 of the furnace setting with the inner vertical face of the box substantially flush with the inside surface of said wall, the box being set in a recess provided in the wall 2, as shown.

Applied against the inner vertical face of each water box 4 are a plurality of tiles or blocks 7, 7, made of fire clay or equivalent material as used in furnace building to insulate the boxes from the heat of the fuel bed on the grate 3 and further prevent the fuel bed at the sides of the grate from contacting with said boxes. The tiles 7 are arranged to cover the boxes throughout the lengths and heights thereof and are not only supported by the boxes, but have engagement therewith permitting the tiles to be readily applied in setting up the furnace and to be removed when desired, as for repair. This connection, in the instance shown in the drawings, takes the form of a wedge shaped part 8 on the back of each tile fitting in a complementary vertical channel formed on the box between suitably shaped parts 9, 9 thereon. The undercut side edges 8$^a$ of the part 8 on the tile interlock behind the undercut side edges 9$^a$, 9$^a$ of the parts 9 on the box. The part 8 and its receiving channel on the box being wedge shaped with the narrowest portion of the wedge at the bottom supports the tile on the box. Each part 8 has a width less than the like dimension of its tile, so that the side portions of the tiles overlap the parts 9 on the boxes and cover the same, the side edges of the tiles on each box substantially abutting, as shown. The tiles 7 are located inside of the furnace walls 2 and thus may be inserted in place by being dropped into the receiving channels from above and be removed from the boxes 4, 4 by being slid upward out of said channels, as is apparent, the furnace walls 2 not interfering with applying and removing the tiles.

Beneath the boxes 4, 4 for supporting the same in the furnace walls are upright chairs 10, 10. These chairs are in the form of flanges or webs on the ledge plates 11, 11, which are laid end to end on the bottoms of the recesses in the walls 2, 2. Said plates 11 are provided with spaced holes 12 to permit mortar to pass through them for anchoring the plates to the walls, as shown in Fig. 4. Secured to these plates 11 are flanged members 13, which may be adjusted toward the side edges of the grate 3 to restrict the passage of air upward around the edges of the grate lead 3 from beneath the same. This adjustment is allowed by bolts 14 extending through slots in the forked projections 15 on the members 13, as shown in Fig. 3. To allow for endwise expansion and contraction of the boxes 4 with respect to the furnace walls 2 and chairs 10, the boxes have keys or lugs 16 fitting in suitable key-ways or slots 17 in the chairs 10, as shown.

By the construction shown and described, the fuel bed on the grate 3 does not contact with the water boxes 4, 4, but with the tiles 7. These receive the direct heat of the fuel bed and, being made of fire brick, insulate the water boxes from the fuel bed and the heat produced in the combustion chamber. The water boxes being kept cool, by a circulation of water therethrough, maintains the tiles relatively cool and prevents the incandescent fuel bed adhering thereto. This prevents the formation of clinkers at the sides of the fuel bed and prolongs the usefulness of the tiles by keeping the temperature thereof reduced below that of the fuel bed moving along and against the same. The tiles have removable connection with the boxes, which permits ready and easy application of the tiles to the boxes when setting up the furnace, and also ready replacement of worn or burned out tiles when making repairs, the boxes being still serviceable, as the tiles insulate them from the fuel bed and the heat thereof.

As shown in Fig. 1, the box 4 has its outer end inclined upward to extend alongside of the coking plates 17. Between the ends of the boxes and adjacent walls of the recesses in which the boxes are placed, is located packing 18 of asbestos, as shown in Fig. 3.

While I have shown and described herein in detail water boxes lined with tiles in accordance with my invention, the details of construction and arrangement of parts may be variously changed and modified without departing from the spirit and scope of my invention.

I claim as my invention:

1. In a furnace, the combination with a combustion chamber and a grate therein, of an elongated box extending along one of the walls of said combustion chamber and supported thereby, and a plurality of tiles supported by said box and extending over and covering the inner side face thereof, said tiles being in direct contact with the fuel bed on the grate and insulating the box therefrom and the heat produced in the combustion chamber, said box having inlet and outlet openings so that a cooling fluid may be circulated through the box for maintaining the same and tiles relatively cool for preventing adherence of the fuel bed to said tiles.

2. In a furnace, the combination with a combustion chamber having side walls and a grate therebetween, of an elongated box extending along one of the side edges of the grate and supported by the adjacent side wall of the combustion chamber, and a plurality of tiles supported by said box and extending over and covering the inner side face thereof, said tiles being in direct contact with the fuel bed on the grate and insulating the box therefrom and the heat produced in the combustion chamber, said box having inlet and outlet openings so that a cooling fluid may be circulated through the box for maintaining the same and tiles relatively cool for preventing adherence of the fuel bed to said tiles.

3. In a furnace, the combination with a combustion chamber and a grate therein, of an elongated box extending along one of the walls of said combustion chamber and supported thereby, a plurality of tiles applied against the inner face of said box and lying in direct contact with the fuel bed on the grate for insulating said box from said fuel bed and the heat produced in the combustion chamber, said box having inlet and outlet openings so that a cooling fluid may be circulated through the box for maintaining the same and tiles relatively cool for preventing adherence of the fuel bed to said tiles, and interlocking means on the tiles and box, respectively, for supporting the tiles on said box and permitting the application to and removal of the tiles from said box.

4. In a furnace, the combination with a combustion chamber and a grate therein, of an elongated box extending along one of the walls of said combustion chamber and supported thereby, a plurality of tiles applied against the inner side face of said box and lying in direct contact with the fuel bed on the grate for insulating said box from said fuel bed and the heat produced in the combustion chamber, said box having inlet and outlet openings so that a cooling fluid may be circulated through the box for maintaining the same and said tiles relatively cool for preventing adherence of the fuel bed to said tiles, and means providing a removable connection between said box and tiles, comprising channels and complementary projections on the respective parts.

5. In a furnace, the combination with a combustion chamber and a grate therein, of an elongated box extending along one of the walls of said combustion chamber and supported thereby, a plurality of tiles applied against the inner side face of said box and lying in direct contact with the fuel bed on the grate for insulating the box from said fuel bed and the heat produced in the combustion chamber, said box having inlet and outlet openings so that a cooling fluid may be circulated through the box for maintaining the same and said tiles relatively cool, said box having a plurality of spaced channels on its inner side face, one channel for each tile, and said tiles having complementary projections on their rear faces for slidably fitting in said channels.

6. In a furnace, the combination with a combustion chamber having side walls and a traveling grate therebetween, of elongated water cooled boxes extending along the side edges of said grate and supported by the side walls of said combustion chamber, a plurality of tiles applied against the inner side faces of said boxes and lying in direct contact with the fuel bed on the grate for insulating said boxes from said fuel bed and the heat produced in the combustion chamber, and means supporting the tiles on the boxes and providing a removable connection between the same and said tiles.

7. In a furnace, the combination with a combustion chamber having side walls and a grate therebetween, of a water cooled box extending along one of the side edges of said grate and set in a recess in the adjacent side wall of said combustion chamber, means in said recess beneath said box for supporting the same, and a plurality of tiles supported by said box and extending over and covering the inner side face thereof, said tiles lying in direct contact with the fuel bed on said grate for insulating said box from said fuel bed.

8. A furnace fixture, comprising an elongated water box having an inner side wall, a plurality of laterally spaced wedge shaped members projecting outward from said side wall and providing wedge shaped channels, and a plurality of tiles to be applied against the inner side wall of said box for covering the same, said tiles having wedge shaped projections on the rear faces thereof to fit in said channels with the side portions of said tiles overlapping the projections on said box, the projections on said tiles and box, respectively, having their engaging side edges undercut to interlock with each other and slidably support the tiles on said box.

In testimony that I claim the foregoing as my invention, I affix my signature, this 13th day of August, A. D. 1921.

HERMAN A. POPPENHUSEN.